(12) United States Patent
Li

(10) Patent No.: US 11,863,394 B2
(45) Date of Patent: Jan. 2, 2024

(54) CONNECTIVITY DETECTION SESSION CREATION METHOD, NETWORK DEVICE, AND SYSTEM

(71) Applicant: HUAWEI TECHNOLOGIES CO., LTD., Shenzhen (CN)

(72) Inventor: Xiaojing Li, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 378 days.

(21) Appl. No.: 17/375,348

(22) Filed: Jul. 14, 2021

(65) Prior Publication Data
US 2021/0344567 A1    Nov. 4, 2021

Related U.S. Application Data

(63) Continuation of application No. PCT/CN2020/071795, filed on Jan. 13, 2020.

(30) Foreign Application Priority Data

Jan. 16, 2019   (CN) .......................... 201910040453.X

(51) Int. Cl.
H04L 41/12       (2022.01)
H04L 12/46       (2006.01)
H04L 45/00       (2022.01)

(52) U.S. Cl.
CPC .......... *H04L 41/12* (2013.01); *H04L 12/4641* (2013.01); *H04L 45/66* (2013.01)

(58) Field of Classification Search
None
See application file for complete search history.

(56) References Cited

U.S. PATENT DOCUMENTS

| 8,953,590 B1* | 2/2015 | Aggarwal ........... H04L 12/4675 |
| | | 370/409 |
| 10,158,567 B1* | 12/2018 | Zhang ................. H04L 12/4633 |
| 10,291,532 B1* | 5/2019 | Tiruveedhula ........ H04L 47/125 |
| 10,644,987 B1* | 5/2020 | Lin ......................... H04L 45/22 |
| 2009/0073988 A1 | 3/2009 | Ghodrat et al. |

(Continued)

FOREIGN PATENT DOCUMENTS

| CN | 101785257 A | 7/2010 |
| CN | 104956628 A | 9/2015 |

(Continued)

*Primary Examiner* — Otis L Thompson, Jr.
(74) *Attorney, Agent, or Firm* — Maier & Maier, PLLC

(57) ABSTRACT

A connectivity detection session creation method, a network device, and a system, to create a connectivity detection session in an EVPN. The method includes: receiving, by the first network device, a creation message of a connectivity detection session from the second network device, where the creation message of the connectivity detection session carries an inclusive multicast route of the second network device and session information of the second network device; determining, by the first network device, that a local inclusive multicast routing table includes the inclusive multicast route of the second network device; and creating, by the first network device, the connectivity detection session with the second network device based on the session information of the second network device.

19 Claims, 3 Drawing Sheets

(56) References Cited

U.S. PATENT DOCUMENTS

| | | | |
|---|---|---|---|
| 2011/0286452 A1* | 11/2011 | Balus | H04L 45/04 |
| | | | 370/390 |
| 2013/0148657 A1* | 6/2013 | Salam | H04L 12/4641 |
| | | | 370/392 |
| 2016/0043876 A1* | 2/2016 | Kotalwar | H04L 12/18 |
| | | | 370/235 |
| 2016/0134525 A1 | 5/2016 | Zhang et al. | |
| 2017/0288953 A1* | 10/2017 | Liu | H04L 12/18 |
| 2017/0339052 A1* | 11/2017 | Arora | H04L 45/28 |
| 2018/0006959 A1* | 1/2018 | Natu | H04L 67/1095 |
| 2018/0034648 A1* | 2/2018 | Nagarajan | H04L 45/033 |
| 2018/0248803 A1* | 8/2018 | Nagarajan | H04L 12/46 |
| 2018/0287946 A1* | 10/2018 | Nagarajan | H04L 12/1877 |
| 2019/0007309 A1* | 1/2019 | Arora | H04L 45/16 |
| 2019/0036736 A1* | 1/2019 | Gao | H04L 12/4633 |
| 2019/0132241 A1* | 5/2019 | Vattem | H04L 12/4633 |
| 2019/0305988 A1* | 10/2019 | Bickhart | H04L 12/4633 |
| 2020/0021523 A1* | 1/2020 | Wang | H04L 12/4633 |
| 2020/0127885 A1* | 4/2020 | Arora | H04L 12/1886 |
| 2020/0127919 A1* | 4/2020 | Nagarajan | H04L 45/28 |
| 2020/0213182 A1* | 7/2020 | Hugar | H04L 12/4641 |
| 2020/0336334 A1* | 10/2020 | He | H04L 41/0816 |
| 2021/0083901 A1* | 3/2021 | He | H04L 45/507 |

FOREIGN PATENT DOCUMENTS

| | | |
|---|---|---|
| CN | 107888406 A | 4/2018 |
| CN | 108462635 A | 8/2018 |
| EP | 3 247 072 A1 | 11/2017 |
| EP | 3 396 902 A1 | 10/2018 |
| WO | 2014/120758 A1 | 8/2014 |
| WO | 2017/221050 A1 | 12/2017 |

\* cited by examiner

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Type | | | | | | | | Length | | | | | | | | Value | | | | | | | | | | | | | | | |
FIG. 2-2
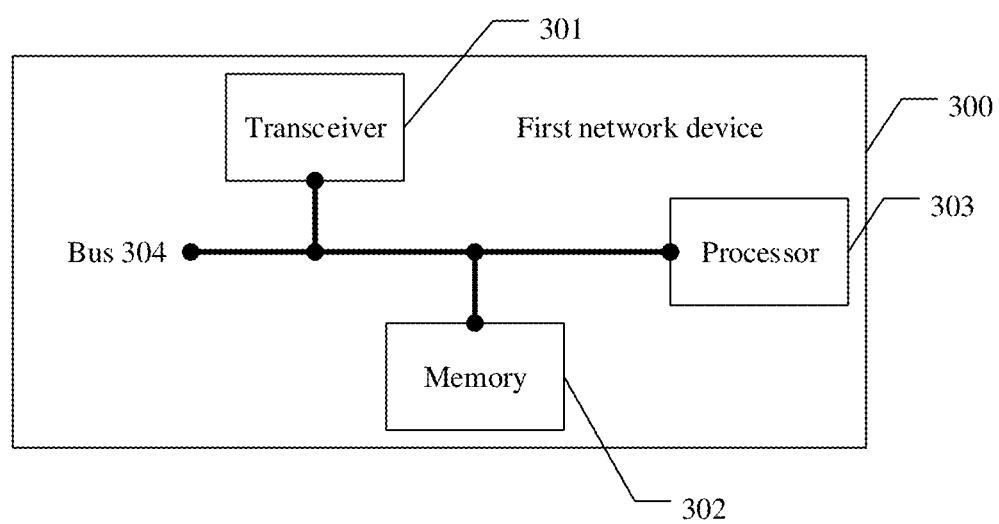
FIG. 3
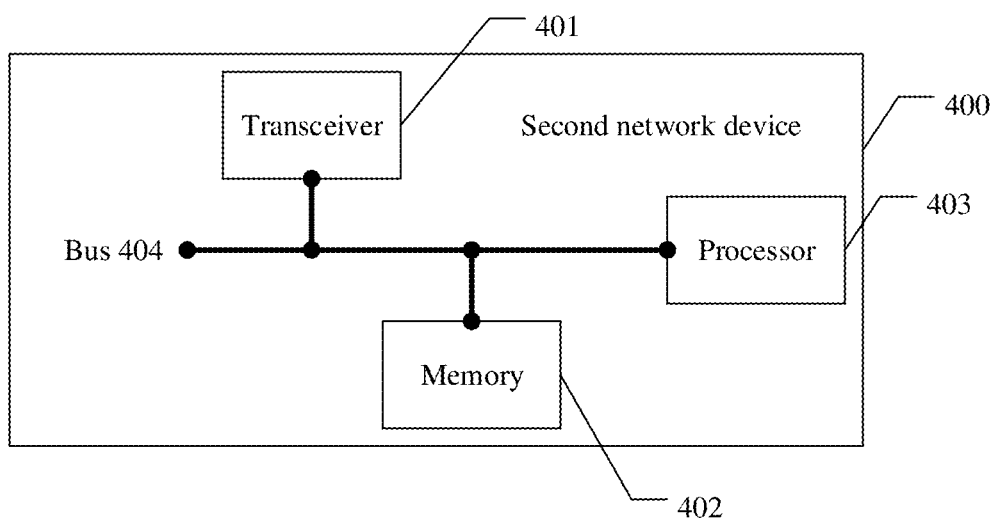
FIG. 4

CONNECTIVITY DETECTION SESSION CREATION METHOD, NETWORK DEVICE, AND SYSTEM

CROSS-REFERENCE TO RELATED APPLICATIONS

This application is a continuation of International Application No. PCT/CN2020/071795, filed on Jan. 13, 2020, which claims priority to Chinese Patent Application No. 201910040453.X, filed on Jan. 16, 2019. The disclosures of the aforementioned applications are hereby incorporated by reference in their entireties

TECHNICAL FIELD

The embodiments relate to the field of communications technologies, and in particular, to a configuration method and a controller.

BACKGROUND

An Ethernet virtual private network (EVPN) is a virtual private network (VPN) technology used to implement layer 2 network interconnection. Several routing types are newly added to the EVPN by extending a border gateway protocol (BGP) or a multiprotocol label switching (MPLS) protocol, to advertise a media access control (MAC) address and an internet protocol (IP) address of a host between different provider edge (PE) devices. A network structure of the EVPN is similar to a network structure of BGP or MPLS. Layer 2 interconnection is implemented between EVPN sites. A PE device accesses a customer edge (CE) device of each site by establishing an EVPN instance.

The EVPN mainly has two network structures: a virtual private wire service (VPWS) and an Ethernet local area network (E-LAN). The VPWS is also referred to as an E-LINE. The E-LINE is an MPLS-based layer 2 VPN service, and is a point-to-point communications service that enables two PEs to communicate with each other bidirectionally. The E-LAN provides a multipoint-to-multipoint layer 2 VPN service. In the E-LAN, a packet is transparently transmitted, so that a plurality of PEs can communicate with each other like in a same local area network.

Connectivity fault management (CFM) needs to be performed in both the E-LINE and the E-LAN. Currently, in the E-LINE, a network administrator mainly configures a matched CFM instance between two PEs that perform E-LINE communication. Therefore, when a local PE sends a creation message of a CFM session to a peer PE, the peer PE may create a CFM session with the local PE. However, for an E-LAN architecture, there are a large quantity of PEs. If a CFM solution is used in the E-LINE, a matched CFM instance needs to be configured between every two PEs. This is time-consuming and labor-intensive.

SUMMARY

Embodiments may provide a connectivity detection session creation method, a network device, and a system, to create a connectivity detection session in an EVPN.

A first aspect provides a connectivity detection session creation method, where the method is applied to an EVPN, the EVPN includes a first network device and a second network device, and the method includes:

receiving, by the first network device, a creation message of a connectivity detection session from the second network device, where the creation message of the connectivity detection session carries an inclusive multicast route of the second network device and session information of the second network device; determining, by the first network device, that a local inclusive multicast routing table includes the inclusive multicast route of the second network device; and creating, by the first network device, the connectivity detection session with the second network device based on the session information of the second network device.

When the first network device is newly added to the EVPN, an inclusive multicast routing table needs to be configured for only the first network device. In this case, when the creation message of the connectivity detection session is received from the second network device, because the creation message of the connectivity detection session from the second network device carries the inclusive multicast route of the second network device and the session information of the second network device, and the local inclusive multicast routing table includes the inclusive multicast route of the second network device, the first network device may create the connectivity detection session with the second network device based on the session information of the second network device. Therefore, a connectivity detection session instance may be configured between the first network device and each original network device in the EVPN without a need of configuring a connectivity detection session instance between the first network device and each existing network device in the EVPN. This simplifies a configuration process.

In some possible implementations, the first network device is a PE, to provide a solution of creating a connectivity detection session between PEs in the EVPN 100. In this solution, a connectivity detection session instance does not need to be configured between the first network device and each existing network device in the EVPN 100. This simplifies a configuration process.

In some possible implementations, receiving, by the first network device, a creation message of a connectivity detection session from the second network device includes: receiving, by the first network device, the creation message of the connectivity detection session that is sent by the second network device in a broadcast or multicast manner. The second network device needs to send only a creation message of one connectivity detection session in a broadcast or multicast manner and does not need to send the creation message to each network device in the EVPN. This reduces transmission resource burden and improves transmission efficiency.

In some possible implementations, before receiving, by the first network device, a creation message of a connectivity detection session from the second network device, the method further includes: obtaining, by the first network device, the inclusive multicast routing table, where the inclusive multicast routing table includes the inclusive multicast route of the second network device. Because the inclusive multicast routing table includes the inclusive multicast route of the second network device, the first network device may determine that the first network device and the second network device belong to a same EVPN, so as to determine that the connectivity detection session needs to be created.

In some possible implementations, a manner in which the first network device obtains the inclusive multicast routing table may be as follows:

The first network device obtains the inclusive multicast routing table based on a configuration of a locally received command line. Therefore, a network administrator may locally input the inclusive multicast routing table into the network device.

Alternatively, a control management device may send an inclusive multicast routing table to the first network device, and the first network device may store the inclusive multicast routing table. Therefore, a network administrator may remotely configure the inclusive multicast routing table through the control management device.

Alternatively, the first network device may receive the inclusive multicast route of the second network device that is advertised by the second network device, and the first network device may store the inclusive multicast route of the second network device in the inclusive multicast routing table. Therefore, the inclusive multicast routing table does not need to be edited in advance, and the inclusive multicast routing table may be dynamically and automatically updated. This meets a requirement of advertising an inclusive multicast route of a new network device to another network device in the EVPN when the new network device enters the network, reduces a workload of a network administrator, and improves working efficiency.

In some possible implementations, the connectivity detection session includes a CFM session, to perform fault detection and management on a connectivity between the first network device and the second network device.

In some possible implementations, a type-length-value (TLV) field in the creation message of the connectivity detection session includes the inclusive multicast route of the second network device, the TLV field includes a type, a length, and a value, the type is used to indicate that a type of the TLV field is the inclusive multicast route, the length is used to indicate a length of the TLV field, and the value is the inclusive multicast route of the second network device. Therefore, a location of the inclusive multicast route in the creation message of the connectivity detection session may be determined, so that the first network device can obtain the inclusive multicast route from the value of the TLV field in the creation message of the connectivity detection session.

In some possible implementations, the session information of the second network device includes a maintenance association end point identifier (MEP ID) or a session identifier Session ID of the second network device, so that the first network device and the second network device can create the connectivity detection session through negotiation.

In some possible implementations, the method may further include:

obtaining, by the first network device, a MEP ID range or a session ID range, where the MEP ID range includes the MEP ID of the second network device, or the session ID range includes the session ID of the second network device; and before the creating, by the first network device, the connectivity detection session with the second network device based on the session information of the second network device, the method further includes: determining, by the first network device, that the MEP ID of the second network device is within the MEP ID range; or determining, by the first network device, that the session ID of the second network device is within the session ID range. Therefore, the first network device may specify that only a network device having a specific MEP ID or session ID can create a connectivity detection session.

In some possible implementations, after the first network device creates the connectivity detection session with the second network device, the first network device determines a sender and a receiver of a fault statistics packet based on a MEP ID of the first network device and the MEP ID of the second network device, or the first network device determines a sender and a receiver of a fault statistics packet based on a session ID of the first network device and the session ID of the second network device, where the sender is one of the first network device and the second network device, and the receiver is the other of the first network device and the second network device.

A second aspect provides a connectivity detection session creation method, where the method is applied to an EVPN, the EVPN includes a first network device and a second network device, and the method includes:

obtaining, by the second network device, an inclusive multicast route of the second network device; and sending, by the second network device, a creation message of a connectivity detection session to the first network device, where the creation message of the connectivity detection session carries the inclusive multicast route and session information of the second network device, and the session information is used to create the connectivity detection session.

When the first network device is newly added to the EVPN, an inclusive multicast routing table needs to be configured for only the first network device. When the creation message of the connectivity detection session is received from the second network device, because the creation message of the connectivity detection session from the second network device carries the inclusive multicast route of the second network device and the session information of the second network device, and the local inclusive multicast routing table includes the inclusive multicast route of the second network device, the first network device may create the connectivity detection session with the second network device based on the session information of the second network device. Therefore, a connectivity detection session instance may be configured between the first network device and each original network device in the EVPN without a need of configuring a connectivity detection session instance between the first network device and each existing network device in the EVPN. This simplifies a configuration process.

In some possible implementations, the obtaining, by the second network device, an inclusive multicast route includes the following:

The second network device obtains the inclusive multicast route of the second network device based on a configuration of a command line. Therefore, a network administrator may locally input an inclusive multicast routing table into the network device.

Alternatively, the second network device may receive an inclusive multicast route sent by a control management device and uses the inclusive multicast route as the inclusive multicast route of the second network device. Therefore, a network administrator may remotely configure the inclusive multicast routing table through the control management device.

The second network device advertises the inclusive multicast route of the second network device to each network device in the EVPN. Therefore, the inclusive multicast routing table does not need to be edited in advance, and the inclusive multicast routing table may be dynamically and automatically updated. This meets a requirement of advertising an inclusive multicast route of a new network device to another network device in the EVPN when the new network device enters the network, reduces a workload of a network administrator, and improves working efficiency.

In some possible implementations, the sending, by the second network device, a creation message of a connectivity detection session to the first network device may include: sending, by the second network device, the creation message of the connectivity detection session to each network device in the EVPN in a broadcast or multicast manner. Therefore, the second network device needs to send only one packet, and does not need to send the packet to each network device in the EVPN. This reduces transmission resource burden and improves transmission efficiency.

In some possible implementations, the connectivity detection session may include a CFM session, to perform fault detection and management on a connectivity between the first network device and the second network device.

In some possible implementations, a TLV field in the creation message of the connectivity detection session includes the inclusive multicast route of the second network device, the TLV field includes a type, a length, and a value, the type is used to indicate that a type of the TLV field is the inclusive multicast route, the length is used to indicate a length of the TLV field, and the value is the inclusive multicast route of the second network device. Therefore, a location of the inclusive multicast route in the creation message of the connectivity detection session may be determined, so that the first network device can obtain the inclusive multicast route from the value of the TLV field in the creation message of the connectivity detection session.

In some possible implementations, the session information of the second network device includes a MEP ID or a session ID of the second network device, so that the first network device and the second network device can create the connectivity detection session through negotiation.

In some possible implementations, after the second network device sends the creation message of the connectivity detection session to each network device in the EVPN, the second network device may receive a response packet of the connectivity detection session that is sent by the first network device, where the response packet of the connectivity detection session includes session information of the first network device; and determines a sender and a receiver of a fault statistics packet based on the session information of the first network device and the session information of the second network device, where the sender is one of the first network device and the second network device, and the receiver is the other of the first network device and the second network device.

A third aspect provides a network device serving as a first network device, including:

a transceiver, a memory, and a processor.

The processor is configured to execute a computer-readable instruction in the memory, to perform the following operations:

receiving a creation message of a connectivity detection session from a second network device, where the creation message of the connectivity detection session carries an inclusive multicast route of the second network device and session information of the second network device; determining that a local inclusive multicast routing table includes the inclusive multicast route of the second network device; and creating the connectivity detection session with the second network device based on the session information of the second network device.

When the first network device is newly added to an EVPN, an inclusive multicast routing table needs to be configured for only the first network device. In this case, when the creation message of the connectivity detection session is received from the second network device, because the creation message of the connectivity detection session from the second network device carries the inclusive multicast route of the second network device and the session information of the second network device, and the local inclusive multicast routing table includes the inclusive multicast route of the second network device, the first network device may create the connectivity detection session with the second network device based on the session information of the second network device. Therefore, a connectivity detection session instance may be configured between the first network device and each original network device in the EVPN without needing to configure a connectivity detection session instance between the first network device and each existing network device in the EVPN. This simplifies a configuration process.

In some possible implementations, the first network device is a PE, to provide a solution of creating a connectivity detection session between PEs in the EVPN. In this solution, a connectivity detection session instance does not need to be configured between the first network device and each existing network device in the EVPN. This simplifies a configuration process.

In some possible implementations, that the processor receives a creation message of a connectivity detection session from a second network device may include: receiving, by the processor, the creation message of the connectivity detection session that is sent by the second network device in a broadcast or multicast manner. The second network device needs to send only one packet, and does not need to send the packet to each network device in the EVPN. This reduces transmission resource burden and improves transmission efficiency.

In some possible implementations, the processor is further configured to obtain the inclusive multicast routing table, where the inclusive multicast routing table includes the inclusive multicast route of the second network device. Therefore, the processor may determine that the first network device and the second network device belong to a same EVPN, so as to determine that the connectivity detection session needs to be created.

In some possible implementations, a manner in which the processor obtains the inclusive multicast routing table may be as follows:

The processor obtains the inclusive multicast routing table based on a configuration of a locally received command line. Therefore, a network administrator may locally input the inclusive multicast routing table into the network device.

Alternatively, the processor may receive an inclusive multicast routing table sent by a control management device, and the first network device stores the inclusive multicast routing table. Therefore, a network administrator may remotely configure the inclusive multicast routing table through the control management device.

Alternatively, the processor receives the inclusive multicast route of the second network device that is advertised by the second network device, and the first network device stores the inclusive multicast route of the second network device in the inclusive multicast routing table. Therefore, the inclusive multicast routing table does not need to be edited in advance, and the inclusive multicast routing table may be dynamically and automatically updated. This meets a requirement of advertising an inclusive multicast route of a new network device to another network device in the EVPN when the new network device enters the network, reduces a workload of a network administrator, and improves working efficiency.

In some possible implementations, the connectivity detection session may include a connectivity fault management CFM session, to perform fault detection and management on a connection between the first network device and the second network device.

In some possible implementations, a TLV field in the creation message of the connectivity detection session may include the inclusive multicast route of the second network device, the TLV field includes a type, a length, and a value, the type is used to indicate that a type of the TLV field is the inclusive multicast route, the length is used to indicate a length of the TLV field, and the value is the inclusive multicast route of the second network device. Therefore, a location of the inclusive multicast route in the creation message of the connectivity detection session may be determined, so that the first network device can obtain the inclusive multicast route from the value of the TLV field in the creation message of the connectivity detection session.

In some possible implementations, the session information of the second network device may include a MEP ID or a session ID of the second network device, so that the first network device and the second network device can create the connectivity detection session through negotiation.

In a possible implementation, the processor is further configured to:

obtain a MEP ID range or a session ID range, where the MEP ID range includes the MEP ID of the second network device, or the session ID range includes the session ID of the second network device; and before the processor receives the creation message of the connectivity detection session from the second network device, the processor is further configured to: determine that the MEP ID of the second network device is within the MEP ID range; or determine that the session ID of the second network device is within the session ID range. Therefore, the first network device may specify that only a network device having a specific MEP ID or session ID can create a connectivity detection session.

In some possible implementations, after the first network device creates the connectivity detection session with the second network device, the processor is further configured to perform the following operation: determining a sender and a receiver of a fault statistics packet based on a MEP ID of the first network device and the MEP ID of the second network device, or determining a sender and a receiver of a fault statistics packet based on a session ID of the first network device and the session ID of the second network device, where the sender is one of the first network device and the second network device, and the receiver is the other of the first network device and the second network device.

A fourth aspect provides a network device serving as a second network device, where the second network device includes:

a transceiver, a memory, and a processor.

The processor is configured to execute a computer-readable instruction in the memory, to perform the following operations:

obtaining an inclusive multicast route of the second network device; and sending a creation message of a connectivity detection session to a first network device, where the creation message of the connectivity detection session carries the inclusive multicast route and session information of the second network device, and the session information is used to create the connectivity detection session.

When the first network device is newly added to an EVPN, an inclusive multicast routing table needs to be configured for only the first network device. In this case, when the creation message of the connectivity detection session is received from the second network device, because the creation message of the connectivity detection session from the second network device carries the inclusive multicast route of the second network device and the session information of the second network device, and the local inclusive multicast routing table includes the inclusive multicast route of the second network device, the first network device may create the connectivity detection session with the second network device based on the session information of the second network device. Therefore, a connectivity detection session instance may be configured between the first network device and each original network device in the EVPN without a need of configuring a connectivity detection session instance between the first network device and each existing network device in the EVPN. This simplifies a configuration process.

In some possible implementations, the network device may include a PE, to provide a solution of creating a connectivity detection session between PEs in the EVPN. In this solution, a connectivity detection session instance does not need to be configured between the first network device and each existing network device in the EVPN. This simplifies a configuration process.

In some possible implementations, the obtaining, by the processor, an inclusive multicast route includes the following:

The processor obtains the inclusive multicast route of the second network device based on a configuration of a command line. Therefore, a network administrator may locally input an inclusive multicast routing table into the network device.

Alternatively, the processor receives an inclusive multicast route sent by a control management device, and uses the inclusive multicast route as the inclusive multicast route of the second network device. Therefore, a network administrator may remotely configure the inclusive multicast routing table through the control management device.

The second network device advertises the inclusive multicast route of the second network device to each network device in the EVPN. Therefore, the inclusive multicast routing table does not need to be edited in advance, and the inclusive multicast routing table may be dynamically and automatically updated. This meets a requirement of advertising an inclusive multicast route of a new network device to another network device in the EVPN when the new network device enters the network, reduces a workload of a network administrator, and improves working efficiency.

In some possible implementations, that the processor sends a creation message of a connectivity detection session to a first network device may include: sending the creation message of the connectivity detection session to each network device in the EVPN in a broadcast or multicast manner. Therefore, the second network device needs to send only one packet, and does not need to send the packet to each network device in the EVPN. This reduces transmission resource burden and improves transmission efficiency.

In some possible implementations, the connectivity detection session may include a CFM session, to perform fault detection and management on a connectivity between the first network device and the second network device.

In some possible implementations, a TLV field in the creation message of the connectivity detection session may include the inclusive multicast route of the second network device, the TLV field includes a type, a length, and a value, the type is used to indicate that a type of the TLV field is the inclusive multicast route, the length is used to indicate a length of the TLV field, and the value is the inclusive multicast route of the second network device. Therefore, a location of the inclusive multicast route in the creation message of the connectivity detection session may be determined, so that the first network device can obtain the inclusive multicast route from the value of the TLV field in the creation message of the connectivity detection session.

In some possible implementations, the session information of the second network device may include a MEP ID or a session ID of the second network device. Therefore, the first network device may specify that only a network device having a specific MEP ID or session ID can create a connectivity detection session.

In some possible implementations, after the second network device sends the creation message of the connectivity detection session to each network device in the EVPN, the second network device may receive a response packet of the connectivity detection session that is sent by the first network device, where the response packet of the connectivity detection session includes session information of the first network device; and determines a sender and a receiver of a fault statistics packet based on the session information of the first network device and the session information of the second network device, where the sender is one of the first network device and the second network device, and the receiver is the other of the first network device and the second network device.

A fifth aspect further provides a computer-readable medium, including an instruction. When the instruction is run on a computer, the computer is enabled to perform the method in the implementations of the first aspect.

A sixth aspect further provides a computer-readable medium, including an instruction. When the instruction is run on a computer, the computer is enabled to perform the method in the implementations of the second aspect.

A seventh aspect further provides a system, including the first network device in the implementations of the third aspect and the second network device in the implementations of the fourth aspect.

It can be learned from the foregoing solutions that the embodiments have the following advantages.

When the first network device is newly added to the EVPN, an inclusive multicast routing table needs to be configured for only the first network device. In this case, when the creation message of the connectivity detection session is received from the second network device, because the creation message of the connectivity detection session from the second network device carries the inclusive multicast route of the second network device and the session information of the second network device, and the local inclusive multicast routing table includes the inclusive multicast route of the second network device, the first network device may create the connectivity detection session with the second network device based on the session information of the second network device. Therefore, a connectivity detection session instance may be configured between the first network device and each original network device in the EVPN without a need of configuring a connectivity detection session instance between the first network device and each existing network device in the EVPN. This simplifies a configuration process.

BRIEF DESCRIPTION OF DRAWINGS

FIG. 2-1 shows a connectivity detection session creation method according to an embodiment;
FIG. 2-2 is a schematic diagram of a TLV according to an embodiment;
FIG. 3 is a schematic diagram of a first network device according to an embodiment;
FIG. 4 is a schematic diagram of a second network device according to an embodiment.

DETAILED DESCRIPTION OF THE EMBODIMENTS

The embodiments provide a connectivity detection session creation method, a network device, and a system, to create a connectivity detection session in an EVPN.

The terms "first", "second", "third", "fourth", and the like (if existent) are intended to distinguish between similar objects but do not necessarily indicate a specific order or sequence. It may be understood that the data termed in such a way are interchangeable in proper circumstances, so that the embodiments of the present invention described herein can be implemented in other orders than the order illustrated or described herein. Moreover, the terms "include" and "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The embodiments are applied to a network scenario of implementing interconnection between VPN sites by using a technology. An EVPN is a layer 2 network interconnection technology. In the EVPN, MAC learning between network devices (for example, PE devices) is implemented on a control plane, and a BGP is used as a protocol of the control plane for a control protocol, to perform MAC address learning, and access topology and VPN site discovery. The EVPN mainly includes a VPWS network and an E-LAN network. The VPWS network is also referred to as an E-Line network. The E-Line network is an MPLS-based layer 2 VPN service, and is a point-to-point communications service that enables two network devices to communicate with each other bidirectionally. The E-LAN provides a multi-point-to-multipoint layer 2 VPN service. In the E-LAN network, a packet is transparently transmitted, so that a plurality of network devices can communicate with each other in a same local area network. In the E-LAN network, each network device may send a data packet in a multicast manner. In other words, any network device in the E-LAN network may send a message to all network devices in the E-LAN network in the multicast manner. The multicast manner may be a broadcast or multicast manner.

It may be understood that a network device is a device that performs a routing and forwarding function, and may be a device such as a router, a switch, or a forwarder. The router, the switch, or the forwarder may be a physical device, or may be a virtual device (for example, a virtual server, a virtual router, a virtual switch, or a virtualized forwarder) implemented based on a virtualization technology. The network device may alternatively be a PE device or the like based on different deployment locations and roles of the network device in a network.

Figure 1:
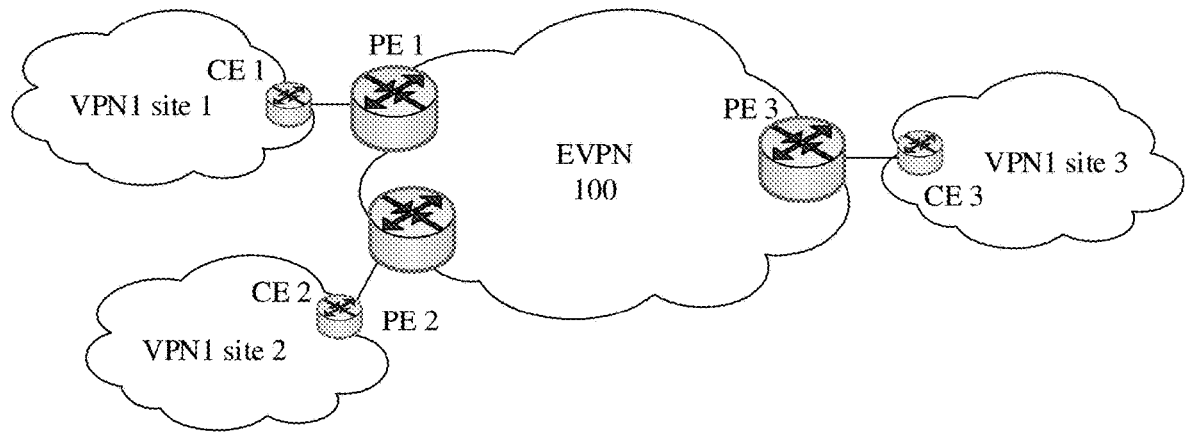
FIG. 1 shows an EVPN 100 according to an embodiment.

For example, in FIG. 1, an EVPN 100 includes at least two network devices, for example, a PE 1, a PE 2, and a PE 3. Three sites (site 1, site 2, and site 3) of a VPN service 1 (VPN1 for short) separately access the EVPN by using a CE 1, a CE 2, and a CE 3, and the three sites are connected to each other through the EVPN.

It may be understood that the EVPN 100 in this embodiment may further include a control management device. The control management device is configured to control and manage the network device in the EVPN 100.

It may be further understood that a problem such as device reboot or a link fault may occur on a connection between any two of the at least two connected network devices, and consequently a network disconnection or network drop occurs. In this case, connectivity detection such as CFM detection needs to be performed between the any two network devices. In a CFM detection process, two network devices periodically send CFM detection packets to each other. If one network device does not receive, in several periods, the CFM detection packet sent by the other network device, it may be determined that the two network devices are disconnected, and therefore an alarm message needs to be reported to the control management device.

In an exemplary implementation, the control management device may be a server in the EVPN. The control management device is configured to receive and process alarm messages reported by the at least two network devices. In an exemplary implementation, the server may vary with a configuration or performance. The server may include one or more central processing units (CPUs) (for example, one or more processors), a memory, and one or more storage media (for example, one or more mass storage devices) for storing an application program or data. The memory and the storage medium may perform temporary storage or permanent storage. The program stored in the storage medium may include one or more modules, and each module may include a series of instruction operations for the server. Further, the central processing unit may be configured to communicate with the storage medium, to perform, on the server, a series of instruction operations in the storage medium.

There are a large quantity of network devices in the EVPN. If a connectivity detection technology that is the same as that in the E-LINE network is used, in other words, if a CFM instance is configured between every two network devices, a workload is heavy and configuration is time-consuming and labor-intensive.

In this embodiment, when a first network device is newly added to the EVPN, an inclusive multicast routing table needs to be configured for only the first network device. In this case, when a creation message of a connectivity detection session is received from a second network device, because the creation message of the connectivity detection session from the second network device carries an inclusive multicast route of the second network device and session information of the second network device, and the local inclusive multicast routing table includes the inclusive multicast route of the second network device, the first network device may create the connectivity detection session with the second network device based on the session information of the second network device. Therefore, a connectivity detection session instance may be configured between the first network device and each original network device in the EVPN without a need of configuring a connectivity detection session instance between the first network device and each existing network device in the EVPN. This simplifies a configuration process.

Figures 1, 2:
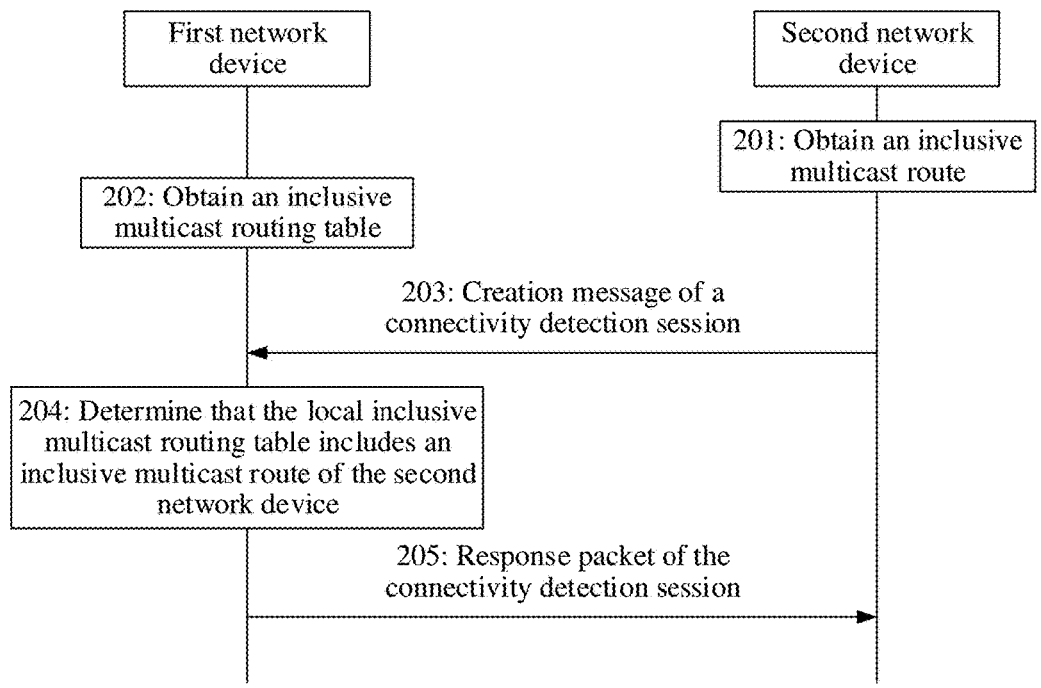

In view of this, referring to FIG. 2-1, the embodiments provide a connectivity detection session creation method, and the method is applied to an EVPN. The EVPN includes a first network device and a second network device. In this embodiment, the second network device is a sender of a connectivity detection session, and the first network device is a receiver of the connectivity detection session. In an exemplary implementation, the second network device may alternatively be a receiver of a connectivity detection session, and the first network device may alternatively be a sender of the connectivity detection session. The method includes the following steps.

201: The second network device obtains an inclusive multicast route of the second network device.

In this embodiment, when the second network device enters the EVPN, the second network device may obtain the inclusive multicast route of the second network device.

In an exemplary implementation, the second network device may locally receive the inclusive multicast route of the second network device that is added by a network administrator by using a command line. In an exemplary implementation, the second network device may receive remote control performed by a network administrator through a control management device, to add the inclusive multicast route of the second network device.

In an exemplary implementation, the control management device may send an inclusive multicast route to the second network device. After receiving the inclusive multicast route, the second network device uses the inclusive multicast route as the inclusive multicast route of the second network device, to complete configuration of the inclusive multicast route. In an exemplary implementation, the network administrator may send an inclusive multicast route to the second network device through the control management device, or the control management device may automatically send an inclusive multicast route to the second network device.

In an exemplary implementation, the control management device may select an available inclusive multicast route from a pre-stored inclusive multicast routing table, and configure the available inclusive multicast route for the second network device. In an exemplary implementation, the control management device may alternatively set a value randomly, configure the value for the second network device, and update an inclusive multicast routing table, so that a value of an entry in the inclusive multicast routing table is the inclusive multicast route of the second network device. It may be understood that the foregoing steps performed by the control management device may be performed by the control management device under control of the network administrator, or may be automatically performed by the control management device.

It may be understood that the inclusive multicast route may carry a route distinguisher (RD), a route target (RT) value, a source IP such as a local loopback interface address of a local network device, and provider multicast service interface (PMSI) information of an EVPN instance on the local network device. The PMSI is used to carry label information encapsulated during multicast packet transmission. The PMSI and the RT value are carried in attribute information of a route, and the RD and the source IP are carried in network layer reachability information (NLRI) of the route.

202: The first network device obtains the inclusive multicast routing table.

In this embodiment, when the first network device newly enters the network, the first network device may obtain the inclusive multicast routing table. The inclusive multicast routing table includes a plurality of entries, and a value of each entry is one inclusive multicast route. It may be understood that the inclusive multicast routing table includes the inclusive multicast route of the second network device.

In other words, a value of an entry in the inclusive multicast routing table is a value of the inclusive multicast route of the second network device.

In an exemplary implementation, the first network device may locally receive the value of each entry in the inclusive multicast routing table that is added by the network administrator by using a command line. In an exemplary implementation, the first network device may alternatively receive remote control performed by the network administrator, to add the value of each entry in the inclusive multicast routing table.

In an exemplary implementation, the control management device may send the inclusive multicast routing table to the first network device, so that the first network device stores the inclusive multicast routing table. In an exemplary implementation, the network administrator may send the inclusive multicast routing table to the first network device through the control management device, or the control management device may automatically send the inclusive multicast routing table to the first network device.

In an exemplary embodiment implementation, the control management device may aggregate values of all possible inclusive multicast routes at a time to obtain one inclusive multicast routing table, and then send the inclusive multicast routing table to all network devices in the EVPN. The control management device may send the inclusive multicast routing table to the first network device when the first network device enters the network, or may periodically send the inclusive multicast routing table to all the network devices in the EVPN in a broadcast or multicast manner.

In an exemplary implementation, the control management device may alternatively periodically update the inclusive multicast routing table, and then periodically send an updated inclusive multicast routing table to all network devices in the EVPN in a broadcast or multicast manner. In an exemplary implementation, the control management device may alternatively configure one inclusive multicast route for the second network device when the second network device enters the network, and then send the inclusive multicast route of the second network device to all network devices in the EVPN in a broadcast or multicast manner, so that all the network devices (for example, the first network device) in the EVPN each update a local inclusive multicast routing table, and a value of an entry in the inclusive multicast routing table is the inclusive multicast route of the second network device. It may be understood that the foregoing steps performed by the control management device may be performed by the control management device under control of the network administrator, or may be automatically performed by the control management device.

In an exemplary implementation, after a BGP neighbor relationship between the first network device and the second network device is successfully established, the first network device and the second network device may transfer respective inclusive multicast routes. Therefore, after obtaining an inclusive multicast route, the second network device may advertise, in a broadcast or multicast manner, the inclusive multicast route to each network device having a BGP neighbor relationship with the second network device in the EVPN. For example, if the first network device has a BGP neighbor relationship with the second network device, the first network device may receive the inclusive multicast route of the second network device that is sent by the second network device, and store the inclusive multicast route of the second network device in the inclusive multicast routing table, to update the inclusive multicast routing table. In an exemplary implementation, the first network device may further receive an inclusive multicast route sent by a network device in the EVPN other than the second network device, and then locally store the inclusive multicast route.

It may be understood that the inclusive multicast routing table may be a spreadsheet format, an electronic file, or a class database stored in a router or a networked computer. In an exemplary implementation, the inclusive multicast routing table stores a path pointing to a specific network address. It may be understood that the inclusive multicast routing table may be fixedly preset by the network administrator, or may be dynamically modified.

It may be understood that, in a same EVPN, inclusive multicast routing tables configured for different network devices may be the same, but inclusive multicast routes configured for different network devices are different. For example, if the first network device and the second network device obtain a same inclusive multicast routing table, values of entries in the inclusive multicast routing table are respectively as follows:

0:32:1.1.1.1, 0:32:2.2.2.2, 0:32:3.3.3.3, 0:32:4.4.4.4, and 0:32:10.10.10.10.

In this case, an inclusive multicast route obtained by the first network device may be 0:32:1.1.1.1, and an inclusive multicast route obtained by the second network device may be 0:32:2.2.2.2.

203: The second network device sends a creation message of a connectivity detection session to the first network device, where the creation message of the connectivity detection session carries the inclusive multicast route of the second network device and session information of the second network device.

In an exemplary implementation, after the second network device enters the EVPN, to perform connectivity detection between the second network device and each network device in the EVPN, the second network device may send a creation message of a connectivity detection session to each network device (for example, the first network device) in the EVPN. After entering the EVPN, the second network device may send the creation message of the connectivity detection session to each network device in the EVPN in a broadcast or multicast manner. In an exemplary implementation, after entering the EVPN, the second network device may send the creation message of the connectivity detection session in a broadcast or multicast manner only once, or may periodically send the creation message of the connectivity detection session in a broadcast or multicast manner.

In an exemplary implementation, the connectivity detection session may be a CFM session. It may be understood that the CFM session is used to implement an operation, administration and maintenance (OAM) function provided in the Institute of Electrical and Electronics Engineers (IEEE) 802.1ag standard, that is, a function of detecting, recovering, and managing, in time, a network exception such as service downgrade or a service failure that occurs on a network device such as a switching device or an optical network device.

It may be understood that the CFM session may be created in a three-way handshake manner. After the second network device sends a creation message of the CFM session to the first network device, the first network device may return a response packet of the CFM session, and then the second network device sends an acknowledgment message to the first network device again, so that the CFM session can be created between the second network device and the first network device. In an exemplary implementation, the CFM session may alternatively be created in a two-way or four-way handshake manner.

It may be understood that, for detailed descriptions of the CFM session, refer to the solicit opinion 802.1ag standard released by the IEEE, and content related to the CFM session is generally incorporated by reference (incorporated by reference) as a whole through copying. For brevity, details are not described herein.

In this embodiment, the creation message of the connectivity detection session that is sent by the second network device carries the inclusive multicast route of the second network device. In an exemplary implementation, a type-length-value TLV field in the creation message of the connectivity detection session includes the inclusive multicast route of the second network device, and the TLV field includes a type, a length, and a value. As shown in FIG. 2-2 (which is a schematic diagram of a TLV), the type may include eight characters and is used to indicate that a type of the TLV field is the inclusive multicast route, the length may include eight characters and is used to indicate a length of the TLV field, and the value may include 16 characters and is used to indicate the inclusive multicast route of the second network device.

204: The first network device determines that the local inclusive multicast routing table includes the inclusive multicast route of the second network device.

In this embodiment, when receiving the creation message of the connectivity detection session that is sent by the second network device, the first network device may obtain the inclusive multicast route of the second network device from the creation message of the connectivity detection session, and compare the inclusive multicast route with a value of each entry in the local inclusive multicast routing table. If the first network device finds the inclusive multicast route of the second network device from the inclusive multicast routing table, it may be considered that the first network device and the second network device belong to a same EVPN. Therefore, the first network device may communicate with the second network device, and needs to create the connectivity detection session. In this case, the first network device may return a response packet of the connectivity detection session to the second network device. If the first network device does not find the inclusive multicast route from the inclusive multicast routing table, it may be considered that the first network device and the second network device do not belong to a same EVPN. Therefore, the first network device may not communicate with the second network device, and does not create the connectivity detection session.

It may be assumed that values of entries in the local inclusive multicast routing table of the first network device are respectively as follows:

0:32:1.1.1.1, 0:32:2.2.2.2, 0:32:3.3.3.3, 0:32:4.4.4.4, and 0:32:10.10.10.10.

If the inclusive multicast route of the second network device that is received by the first network device is 0:32:2.2.2.2, the inclusive multicast routing table includes the inclusive multicast route of the second network device. Therefore, it is determined that the second network device and the first network device belong to the same EVPN. In this case, the first network device determines to create the connectivity detection session with the second network device.

It may be understood that, when the connectivity detection session is created between the first network device and the second network device, negotiation needs to be performed by using session information of the first network device and the second network device, to create the connectivity detection session. In an exemplary implementation, the session information includes a MEP ID or a session ID.

The CFM session is used as an example. When the CFM session needs to be created between the first network device and the second network device, the creation message of the CFM session that is sent by the second network device to the first network device carries a MEP ID of the second network device as the session information. Then, the first network device returns the response packet of the CFM session to the second network device, and the response packet carries a MEP ID of the first network device. Therefore, the CFM session is finally created between the first network device and the second network device.

In an exemplary implementation, the first network device may preset a MEP ID range, and the MEP ID range includes a plurality of MEP IDs. When receiving the creation message of the CFM session that is sent by the second network device, the first network device obtains the session information in the creation message, that is, the MEP ID of the second network device. The first network device determines whether the MEP ID of the second network device is within the MEP ID range. If the MEP ID of the second network device is within the MEP ID range, the first network device performs the step of creating the CFM session with the second network device; otherwise, the first network device does not perform the step.

In an exemplary implementation, the second network device may alternatively set a MEP ID range. When receiving a creation response of the CFM session that is returned by the first network device, the second network device may obtain session information in the creation response, that is, the MEP ID of the first network device. The second network device determines whether the MEP ID of the first network device is within the MEP ID range. If the MEP ID of the first network device is within the MEP ID range, the first network device performs the step of creating the CFM session with the second network device; otherwise, the first network device does not perform the step.

It may be understood that The MEP ID range that is set by the first network device may be the same as or may be different from the MEP ID range that is set by the second network device. In an exemplary implementation, the first network device or the second network device may alternatively not set the MEP ID range.

In an exemplary implementation, the session message carries the session ID, so that the first network device determines, based on a session ID range, whether to create the connectivity detection session. This step is similar to the foregoing case in which the session message carries the MEP ID, and is not described herein again.

205: The first network device sends the response packet of the connectivity detection session to the second network device, where the response packet of the connectivity detection session includes the session information of the first network device.

In this embodiment, after the first network device determines that the inclusive multicast route of the second network device is in the local inclusive multicast routing table, the first network device may create the connectivity detection session with the second network device based on the session information of the second network device. The first network device may send the response packet of the connectivity detection session to the second network device, and the response packet of the connectivity detection session includes the session information of the first network device, so that the second network device creates the connectivity detection session with the first network device based on the session information of the first network device.

In an exemplary implementation, if the connectivity detection session is created in a three-way handshake manner, the second network device further sends an acknowledgment message to the first network device, and therefore the connectivity detection session is created between the second network device and the first network device. If the connectivity detection session is created in a two-way handshake manner, the second network device does not need to send an acknowledgment message to the first network device. After the first network device sends the response packet of the connectivity detection session to the second network device, the connectivity detection session is created between the second network device and the first network device. Alternatively, the connectivity detection session may be created in a four-way handshake manner.

In this embodiment, the response packet of the connectivity detection session that is sent by the first network device to the second network device carries an inclusive multicast route of the first network device, so that the second network device can determine whether a local inclusive multicast routing table includes the inclusive multicast route of the first network device. If the local inclusive multicast routing table includes the inclusive multicast route of the first network device, the second network device returns the acknowledgment message to the first network device, to complete creation of the connectivity detection session.

In this embodiment, in the foregoing steps, the network administrator may configure an instance of the connectivity detection session between the first network device and each original network device in the EVPN without a need of configuring an instance of the connectivity detection session between the first network device and each existing network device in the EVPN. This simplifies a configuration process.

It may be understood that, after the connectivity detection session is created between the first network device and the second network device, the first network device and the second network device may periodically send connectivity detection packets to each other. The first network device periodically sends a connectivity detection packet to the second network device, and/or the first network device receives a connectivity detection packet periodically sent by the second network device. If the first network device does not receive, in several periods, a connectivity detection packet sent by the second network device, or if the second network device does not receive, in several periods, a connectivity detection packet sent by the first network device, the first network device or the second network device reports an alarm message to the control management device. If the first network device does not receive, in a preset quantity of periods, the connectivity detection packet sent by the second network device, the first network device reports the alarm message to the control management device, or if the second network device does not receive, in a preset quantity of periods, the connectivity detection packet sent by the first network device, the second network device reports the alarm message to the control management device.

In an exemplary implementation, after the connectivity detection session is created between the first network device and the second network device, fault statistics such as Y1731 statistics needs to be collected for a problem such as a fault or a disconnection. During Y1731 statistics collection, a fault statistics packet may be sent and received between the first network device and the second network device, where one party sends the fault statistics packet, and the other party receives the fault statistics packet.

An example in which the session information is the MEP ID is used. The first network device and the second network device may be determined as a sender and a receiver of the fault statistics packet based on the MEP ID of the first network device and the MEP ID of the second network device. The sender is one of the first network device and the second network device, and the receiver is the other of the first network device and the second network device.

The sender and the receiver may be determined based on a value of the MEP ID of the first network device and a value of the MEP ID of the second network device. For example, a network device having a larger MEP ID value is used as the receiver, and a network device having a smaller MEP ID value is used as the sender. Alternatively, in an exemplary implementation a network device having a larger MEP ID value may be used as the sender, and a network device having a smaller MEP ID value may be used as the receiver. In another exemplary implementation, determining may alternatively be performed in another manner, for example, based on an inclusive multicast route size or a session ID size.

The foregoing describes the solutions from the perspective of method steps. The following describes the embodiments from the perspective of a function apparatus.

Referring to FIG. 3, a network device serving as a first network device 300 is further provided, and includes:

a transceiver 301, a memory 302, a processor 303, and a bus 304, where the transceiver 301, the memory 302, and the processor 303 are connected by using the bus 304.

The processor 303 is configured to execute a computer-readable instruction in the memory 302, to perform the following operations:

receiving a creation message of a connectivity detection session from a second network device, where the creation message of the connectivity detection session carries an inclusive multicast route of the second network device and session information of the second network device; determining that a local inclusive multicast routing table includes the inclusive multicast route of the second network device; and creating the connectivity detection session with the second network device based on the session information of the second network device.

An inclusive multicast routing table only needs to be locally configured for the first network device. Therefore, a connectivity detection session instance may be configured between the first network device and each original network device in an EVPN without a need of configuring a connectivity detection session instance between the first network device and each existing network device in the EVPN. This simplifies a configuration process.

In an exemplary implementation, the first network device may be a PE, to provide a solution of creating a connectivity detection session between PEs in the EVPN. In this solution, a connectivity detection session instance does not need to be configured between the first network device and each existing network device in the EVPN. This simplifies a configuration process.

In an exemplary implementation, the processor 303 may further receive the creation message of the connectivity detection session that is sent by the second network device in a broadcast or multicast manner. The second network device needs to send only one packet, and does not need to send the packet to each network device in the EVPN. This reduces transmission resource burden and improves transmission efficiency.

In an exemplary implementation, the processor 303 may further obtain the inclusive multicast routing table, where the inclusive multicast routing table includes the inclusive multicast route of the second network device. Therefore, the processor 303 may determine that the first network device and the second network device belong to a same EVPN, so as to determine that the connectivity detection session needs to be created between the first network device and the second network device.

In an exemplary implementation, a manner in which the processor 303 obtains the inclusive multicast routing table may include the following:

The processor 303 obtains the inclusive multicast routing table based on a configuration of a locally received command line. Therefore, a network administrator may locally input the inclusive multicast routing table into the network device.

Alternatively, the processor 303 may receive an inclusive multicast routing table sent by a control management device, so that the memory 302 stores the inclusive multicast routing table. Therefore, a network administrator may remotely configure the inclusive multicast routing table through the control management device.

Alternatively, the processor 303 may receive the inclusive multicast route of the second network device that is advertised by the second network device, and the memory 302 stores the inclusive multicast route of the second network device in the inclusive multicast routing table. The inclusive multicast routing table does not need to be edited in advance, and the inclusive multicast routing table may be dynamically and automatically updated. This meets requirements of different network devices in different periods, reduces a workload of a network administrator, and improves working efficiency.

The processor 303 is further configured to obtain a MEP ID range or a session ID range, where the MEP ID range includes a MEP ID of the second network device, or the session ID range includes a session ID of the second network device. Therefore, the first network device may specify that only a network device having a specific MEP ID or session ID can create a connectivity detection session.

Before performing the step of creating the connectivity detection session with the second network device based on the session information of the second network device, the processor 303 may further determine that the MEP ID of the second network device is within the MEP ID range, or determine that the session ID of the second network device is within the session ID range, and therefore may create the connectivity detection session. Otherwise, the processor may not create the connectivity detection session.

In an exemplary implementation, after the first network device creates the connectivity detection session with the second network device, the processor 303 may further determine a sender and a receiver of a fault statistics packet based on a MEP ID of the first network device and the MEP ID of the second network device, or determine a sender and a receiver of a fault statistics packet based on a session ID of the first network device and the session ID of the second network device, where the sender is one of the first network device and the second network device, and the receiver is the other of the first network device and the second network device.

It may be understood that the processor 303 may be a CPU, a network processor (NP), or a combination of the CPU and the NP. The processor 303 may alternatively be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 303 may be one processor, or may include a plurality of processors. The transceiver 301 is configured to receive BGP routing information from the second network device, and send the BGP routing information to the processor 303 for subsequent operation processing. The BGP routing information includes a destination address, and a next-hop address and attribute information of the destination address. The attribute information indicates a manner in which the first network device performs route recursion processing on the next-hop address. The memory 302 may include a volatile memory, such as a random access memory (RAM); or the memory may include a nonvolatile memory, such as a read-only memory (ROM), a flash memory, a hard disk drive (HDD), or a solid-state drive (SSD); or the memory may include a combination of the foregoing types of memories. The memory 302 stores a computer-readable instruction, and the computer-readable instruction includes at least one software module. After executing each software module, the processor 303 may perform a corresponding operation according to an instruction of each software module.

Referring to FIG. 4, the embodiments may further provide a network device serving as a second network device 400. The second network device 400 includes:

a transceiver 401, a memory 402, a processor 403, and a bus 404, where the transceiver 401, the memory 402, and the processor 403 are connected by using the bus 404.

The processor 403 is configured to execute a computer-readable instruction in the memory 402, to perform the following operations:

obtaining an inclusive multicast route of the second network device 400; and sending a creation message of a connectivity detection session to a first network device 300, where the creation message of the connectivity detection session carries the inclusive multicast route and session information of the second network device 400, and the session information is used to create the connectivity detection session.

An inclusive multicast route only needs to be locally configured for the second network device 400. Therefore, a connectivity detection session instance may be configured between the second network device 400 and each original network device in an EVPN without a need of configuring a connectivity detection session instance between the second network device 400 and each existing network device in the EVPN. This simplifies a configuration process.

In an exemplary implementation, the second network device 400 includes a PE, to provide a solution of creating a connectivity detection session between PEs in the EVPN. In this solution, a connectivity detection session instance does not need to be configured between the first network device 300 and each existing network device in the EVPN. This simplifies a configuration process.

In an exemplary implementation, the processor 403 is configured to:

send the creation message of the connectivity detection session to each network device in the EVPN in a broadcast or multicast manner. Therefore, the second network device 400 needs to send only one packet, and does not need to send the packet to each network device in the EVPN. This reduces transmission resource burden and improves transmission efficiency.

In an exemplary implementation, that the processor 403 obtains the inclusive multicast route includes the following:

The processor 403 obtains the inclusive multicast route of the second network device 400 based on a configuration of a command line. Therefore, a network administrator may locally input an inclusive multicast routing table into the network device.

Alternatively, the processor 403 receives the inclusive multicast route sent by a control management device, and uses the inclusive multicast route as the inclusive multicast route of the second network device 400. Therefore, a network administrator may remotely configure the inclusive multicast routing table through the control management device.

The inclusive multicast route of the second network device 400 may be advertised to each network device in the EVPN. Therefore, the inclusive multicast routing table does not need to be edited in advance, and the inclusive multicast routing table may be dynamically and automatically updated. This meets requirements of different network devices in different periods, and reduces a workload of a network administrator.

In an exemplary implementation, the processor 403 may send the creation message of the connectivity detection session to each network device in the EVPN in a broadcast or multicast manner. Therefore, the second network device 400 needs to send only one packet, and does not need to send the packet to each network device in the EVPN. This reduces transmission resource burden and improves transmission efficiency.

In an exemplary implementation, after the processor 403 sends the creation message of the connectivity detection session to each network device in the EVPN, the processor 403 is further configured to perform the following operations:

receiving a response packet of the connectivity detection session that is sent by the first network device 300, where the response packet of the connectivity detection session includes session information of the first network device 300; and determining a sender and a receiver of a fault statistics packet based on the session information of the first network device 300 and the session information of the second network device 400, where the sender is one of the first network device 300 and the second network device 400, and the receiver is the other of the first network device 300 and the second network device 400.

It may be understood that the processor 403 may be a CPU, a NP, or a combination of the CPU and the NP. The processor 403 may alternatively be an ASIC, a PLD, or a combination thereof. The PLD may be a CPLD, a FPGA, GAL, or any combination thereof. The processor 403 may be one processor, or may include a plurality of processors. The transceiver 401 is configured to receive BGP routing information from the second network device, and send the packet to the processor 403 for subsequent operation processing. The BGP routing information includes a destination address, and a next-hop address and attribute information of the destination address. The attribute information indicates a manner in which the first network device performs route recursion processing on the next-hop address. The memory 402 may include a volatile memory, such as a RAM; or the memory may include a nonvolatile memory, such as a ROM, a flash memory, a HDD, or a SSD; or the memory may include a combination of the foregoing types of memories. The memory 402 stores a computer-readable instruction, and the computer-readable instruction includes at least one software module. After executing each software module, the processor 403 may perform a corresponding operation according to an instruction of each software module.

Figure 5:
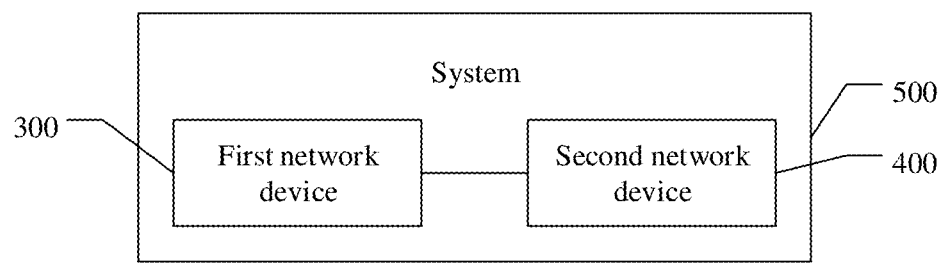
FIG. 5 is a schematic diagram of a system according to an embodiment.

As shown in FIG. 5, a system 500 is further provided, which includes a first network device 300 and a second network device 400. The first network device 300 is the first network device in FIG. 3, and the second network device 400 is the second network device in FIG. 4. For detailed descriptions of each device in the system 500, refer to related embodiments in FIG. 3, FIG. 4, and the like. Details are not described herein again.

All or some of the foregoing embodiments may be implemented through software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedure or functions according to the embodiments are all or partially generated. The computer may be a general purpose computer, a special purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium, or a semiconductor medium.

It may be understood by persons of ordinary skill in the art that, for the purpose of convenient and brief description, for a detailed working process of the foregoing system, apparatus, and unit, refer to a corresponding process in the foregoing method embodiments. Details are not described herein again.

In the several embodiments provided, it may be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

Function units in the embodiments may be integrated into one processing unit, or each of the units may exist alone physically, or two or more units are integrated into one unit.

The integrated unit may be implemented in a form of hardware, or may be implemented in a form of a software function unit.

When the functions are implemented in a form of a software function unit and sold or used as an independent product, the functions may be stored in a computer-readable storage medium. Based on such an understanding, the solutions essentially, or the part contributing to the prior art, or some of the solutions may be implemented in a form of a software product. The computer software product is stored in a storage medium, and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk, a ROM, a RAM), a magnetic disk, or an optical disc.

The foregoing embodiments are merely intended for describing the solutions, but are non-limiting. Although embodiments are described in detail, persons of ordinary skill in the art may understand that they may still make modifications to the solutions described or make equivalent replacements to some features thereof, without departing from the spirit and scope of the solutions of the embodiments.

What is claimed is:

1. A connectivity detection session creation method, wherein the method is applied to an Ethernet virtual private network (EVPN), the EVPN comprises a first network device and a second network device, and the method comprises:
   receiving, by the first network device, a creation message of a connectivity detection session from the second network device, wherein the creation message of the connectivity detection session carries an inclusive multicast route of the second network device and session information of the second network device;
   determining, by the first network device, that a local inclusive multicast routing table comprises the inclusive multicast route of the second network device; and
   creating, by the first network device, the connectivity detection session with the second network device based on the session information of the second network device.

2. The method according to claim 1, wherein the receiving, by the first network device, of a creation message of a connectivity detection session from the second network device comprises:
   receiving, by the first network device, the creation message of the connectivity detection session that is sent by the second network device in a broadcast or multicast manner.

3. The method according to claim 1, wherein before the receiving, by the first network device, of a creation message of a connectivity detection session from the second network device, the method further comprises:
   obtaining, by the first network device, the inclusive multicast routing table, wherein the inclusive multicast routing table comprises the inclusive multicast route of the second network device.

4. The method according to claim 1, wherein the connectivity detection session comprises a connectivity fault management (CFM) session.

5. The method according to claim 1, wherein a type-length-value (TLV) field in the creation message of the connectivity detection session comprises the inclusive multicast route of the second network device, the TLV field comprises a type, a length, and a value, the type is used to indicate that a type of the TLV field is the inclusive multicast route, the length is used to indicate a length of the TLV field, and the value is the inclusive multicast route of the second network device.

6. The method according to claim 1, wherein the session information of the second network device comprises a maintenance association end point identifier (MEP ID) or a session identifier (Session ID) of the second network device.

7. The method according to claim 6, further comprising:
   obtaining, by the first network device, an MEP ID range or a session ID range, wherein the MEP ID range comprises the MEP ID of the second network device, or the session ID range comprises the session ID of the second network device; and
   before the creating, by the first network device, of the connectivity detection session with the second network device based on the session information of the second network device, the method further comprises:
   determining, by the first network device, that the MEP ID of the second network device is within the MEP ID range; or
   determining, by the first network device, that the session ID of the second network device is within the session ID range.

8. A connectivity detection session creation method, wherein the method is applied to an Ethernet virtual private network (EVPN), the EVPN comprises a first network device and a second network device, and the method comprises:
   obtaining, by the second network device, an inclusive multicast route of the second network device; and
   sending, by the second network device, a creation message of a connectivity detection session to the first network device, wherein the creation message of the connectivity detection session carries the inclusive multicast route and session information of the second network device, and the session information is used to create the connectivity detection session.

9. The method according to claim 8, wherein the sending, by the second network device, of a creation message of a connectivity detection session to the first network device comprises:
   sending, by the second network device, the creation message of the connectivity detection session to each network device in the EVPN in a broadcast or multicast manner.

10. The method according to claim 8, wherein the connectivity detection session comprises a connectivity fault management (CFM) session.

11. The method according to claim 8, wherein a type-length-value (TLV) field in the creation message of the connectivity detection session comprises the inclusive multicast route of the second network device, the TLV field comprises a type, a length, and a value, the type is used to indicate that a type of the TLV field is the inclusive multicast route, the length is used to indicate a length of the TLV field, and the value is the inclusive multicast route of the second network device.

12. The method according to claim 8, wherein the session information of the second network device comprises a maintenance association end point identifier (MEP ID) or a session identifier (session ID) of the second network device.

13. A network device serving as a first network device, comprising:
   a transceiver, a memory, and a processor, wherein the processor is configured to execute a computer-readable instruction in the memory to cause the network device to perform the following operations:

receiving a creation message of a connectivity detection session from a second network device, wherein the creation message of the connectivity detection session carries an inclusive multicast route of the second network device and session information of the second network device;

determining that a local inclusive multicast routing table comprises the inclusive multicast route of the second network device; and creating the connectivity detection session with the second network device based on the session information of the second network device.

14. The first network device according to claim 13, wherein the processor is configured to execute the instruction to cause the network device to:

receive the creation message of the connectivity detection session that is sent by the second network device in a broadcast or multicast manner.

15. The first network device according to claim 13, wherein the processor is further configured to:

obtain the inclusive multicast routing table, wherein the inclusive multicast routing table comprises the inclusive multicast route of the second network device.

16. The first network device according to claim 13, wherein the connectivity detection session comprises a connectivity fault management (CFM) session.

17. The first network device according to claim 13, wherein a type-length-value (TLV) field in the creation message of the connectivity detection session comprises the inclusive multicast route of the second network device, the TLV field comprises a type, a length, and a value, the type is used to indicate that a type of the TLV field is the inclusive multicast route, the length is used to indicate a length of the TLV field, and the value is the inclusive multicast route of the second network device.

18. The first network device according to claim 13, wherein the session information of the second network device comprises a MEP ID or a session ID of the second network device.

19. The first network device according to claim 13, wherein the processor is further configured to:

obtain a maintenance association end point identifier (MEP ID) range or a session identifier (session ID) range, wherein the MEP ID range comprises the MEP ID of the second network device, or the session ID range comprises the session ID of the second network device; and the processor is further configured to:

determine that the MEP ID of the second network device is within the MEP ID range before the first network device receives the creation message of the connectivity detection session from the second network device; or determine that the session ID of the second network device is within the session ID range before the first network device receives the creation message of the connectivity detection session from the second network device.

* * * * *